April 19, 1927.  
S. I. FEKETE ET AL  
1,625,718  
AUTOMOBILE ENGINE  
Filed May 13, 1925  
2 Sheets-Sheet 1

INVENTORS:  
Stephen I. Fekete and Stuart G. Baits.  
by Macleod, Calver, Copeland & Dike.  
Attys.

Patented Apr. 19, 1927.

1,625,718

UNITED STATES PATENT OFFICE.

STEPHEN IVAN FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

AUTOMOBILE ENGINE.

Application filed May 13, 1925. Serial No. 29,928.

An internal combustion engine of the type now almost universally employed in motor vehicles includes an engine block in the form of an integral casting cored out to form a plurality of cylinders and inlet and exhaust passages communicating with the respective cylinders through suitable valve seats, means for supporting the engine block in the chassis frame, a crankshaft connected with pistons in the cylinders, and a parallel cam shaft, suitably geared to the crankshaft, for operating the inlet and exhaust valves. In addition to the crankshaft and cam shaft, such an engine also usually includes a third parallel shaft for operating one or more of the moving parts or elements forming essential parts of and necessary to the operation of the engine, such, for example, as the ignition timer or distributor, and also, in some instances various engine adjuncts, such, for example, as a magneto or generator, an oil pump, or a water pump. If, as is usually the case, the engine block be formed with lugs or projections for securing the same in place in the chassis frame and be provided with the centres or bearings for all three of the shafts above referred to, said block is of such an unwieldly size and shape as to be difficult and expensive to cast, machine, and handle, while the assembling of the various moving parts and adjuncts therewith is also a relatively difficult and expensive matter.

The present invention has for its object to simplify and reduce the necessary size of the engine block, to facilitate the machining of the faces thereof and especially that side face to which the usual cover for enclosing the valve mechanism is secured, so as to simplify the fitting of said cover, and to permit the assembling of the several moving parts or elements referred to with their shaft and with their respective supports and bearings at the bench independently of the other parts of the engine, thereby expediting the chain assembly of the car as a whole by avoiding the delays incidental to the placing of a large number of small parts. To these ends the invention consists in mounting the third shaft independently of the engine block in a separate plate secured to one face of the latter, which plate preferably constitutes a support for the engine block, as more fully explained in application Serial No. 652,938, filed July 21, 1923, by Stephen I. Fekete, and also preferably serves to support the several elements driven by said third shaft.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departure from its spirit and scope.

Figure 1:
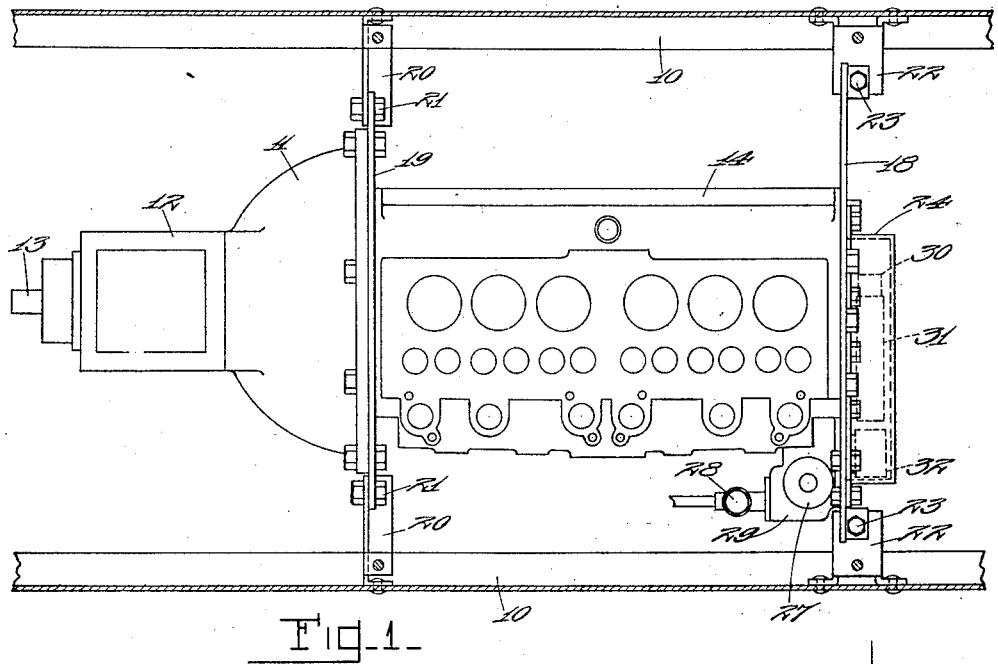
Fig. 1 is a plan view and Fig. 2 is a side elevation of an engine embodying the invention, showing the same in place in the frame of the automobile.
Figure 2:
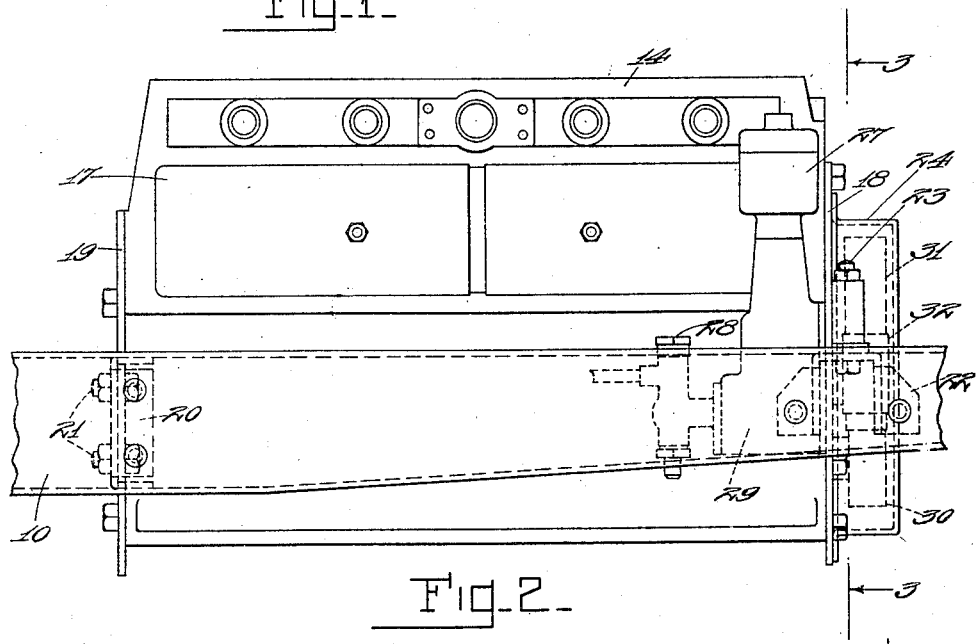
Figure 3:
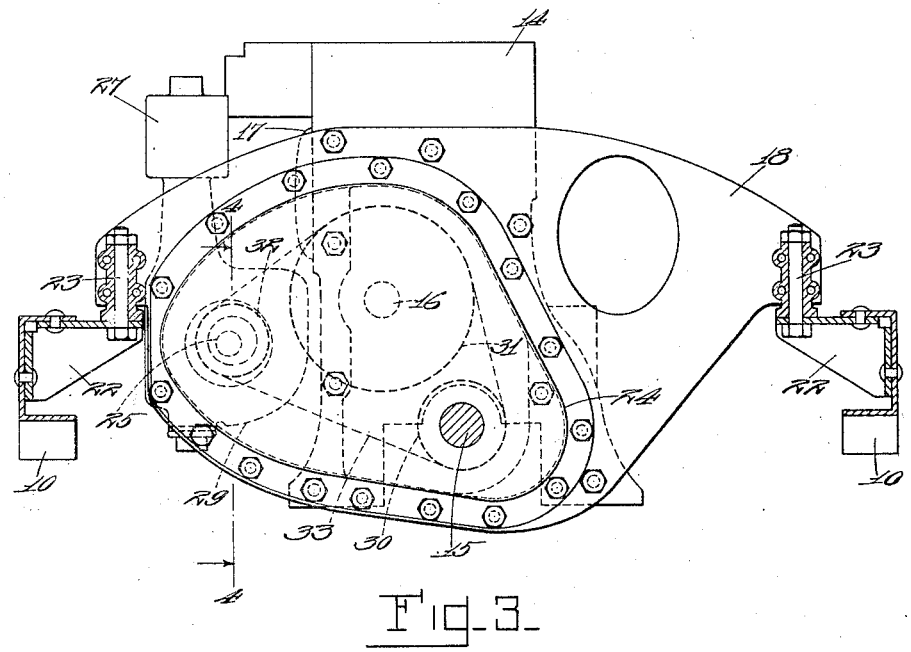
Fig. 3 is a section taken substantially on the line 3—3, Fig. 2.
Figure 4:
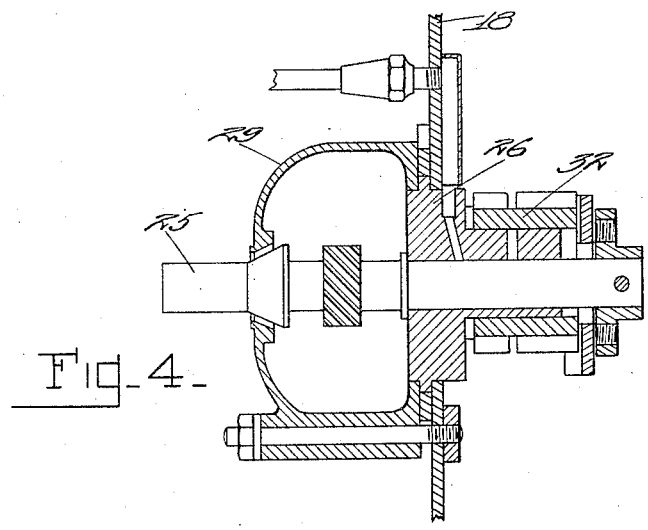
Fig. 4 is a section taken substantially on the line 4—4, Fig. 3.

Referring to the drawings, 10 denotes the side members of the automobile chassis frame, 11 the clutch housing, 12 the transmission casing, 13 the propeller shaft, and 14 the engine block which as herein shown is substantially as disclosed and claimed in our application filed July 21, 1923, Serial No. 652,898. Said engine block carries the bearings or centres for the crankshaft 15 and cam shaft 16 and is formed with flat top, bottom, side, and end faces, having fitted to one of its flat side faces a cover 17 for the valve mechanism operated by the cam shaft 16. Bolted to the flat front and rear end faces of the engine block are flat plates 18 and 19 which, as in application Ser. No. 652,938, above referred to, serve to support said engine block from the frame side members 10. To this end said frame members are provided with a pair of rear brackets 20 to vertical faces of which the ends of the plate 19 are secured by horizontal bolts 21, and with a pair of front brackets 22 to horizontal faces of which the ends of the plate 18 are secured by vertical bolts 23. The clutch housing 11 is bolted to the rear face of the plate 19, while to the front face of the plate 18 is bolted a casing 24 for the timing gearing hereinafter referred to. The plate 18 is formed with suitable openings through which the crank shaft 15 and cam shaft 16 pass loosely.

Mounted on the plate 18 adjacent the engine block 14 is an assembly of engine parts and adjuncts herein shown as a unit of the character disclosed and claimed in our application Serial No. 655,758, filed August 4, 1923. Said assembly comprises a shaft 25 journalled in a preferably adjustable bearing 26 carried by the plate 18, a combined ignition timer and distributor 27, an oil pump 28, and a casing 29 supported by the plate 18, supporting the timer and oil pump, and enclosing the gearing connecting the timer and pump shafts with each other and with the shaft 25. Within the gear casing 24 the crankshaft 15, cam shaft 16, and shaft 25 are provided with sprockets 30, 31, and 32, respectively, connected by a chain 33, whereby said shafts are driven in unison and in properly timed relationship.

It will be seen that by centering the shaft 25 in a separate supporting plate instead of in the engine block, as has heretofore been the custom, said block may be materially reduced in size and simplified in construction, making it possible to machine the side thereof flat for the convenient fitting of the valve mechanism cover 17. It will also be seen that the several adjuncts with their shaft may be assembled at the bench on the plate 18 prior to the attachment of said plate to the engine block and the placing of the latter in the car, thereby making possible more accurate work and avoiding expensive delays in the general assembly operation.

Having thus described our invention, we claim:

1. The combination of an engine block, a crankshaft, a cam shaft, a third shaft for driving one or more of the essential moving parts of the engine, said engine block having centers for said crankshaft and cam shaft, and a flat plate secured to one face of said engine block and carrying the center for said third shaft.

2. The combination of an engine block, a crankshaft, a cam shaft, a third shaft for driving one or more of the essential moving parts of the engine, sprockets on all of said shafts, a drive chain connecting all of said sprockets, said engine block having centers for said crankshaft and cam shaft, and a flat plate secured to one face of said engine block and carrying the center for said third shaft.

3. The combination of an engine block, means for supporting the same including flat plates secured to the end faces thereof, a crankshaft, a cam shaft, and a third shaft for driving one or more of the essential moving parts of the engine, said engine block having centers for said crankshaft and cam shaft, and one of said plates having a center for said third shaft.

4. The combination of an engine block, means for supporting the same including flat plates secured to the end faces thereof, a pair of frame side members to which the opposite ends of both of said plates are secured, a crankshaft, a cam shaft, and a third shaft for driving one or more of the essential moving parts of the engine, said engine block having centers for said crankshaft and cam shaft, and one of said plates having a center for said third shaft.

5. The combination of an engine block, a crankshaft, a cam shaft, bearings for said shafts carried by the engine block, a flat plate secured to one face of the engine block for supporting the latter, a third shaft, a bearing for said third shaft carried by said plate, and a timer and pump assembly supported by said plate independently of said engine block and driven by said third shaft.

6. The combination of an engine block, a crankshaft, a cam shaft, a timer shaft, said engine block having centers for said crankshaft and cam shaft, and a flat plate secured to one face of said engine block and carrying the center for said timer shaft.

In testimoney whereof we affix our signatures.

STEPHEN IVAN FEKETE.
STUART G. BAITS.